(12) United States Patent
Nee et al.

(10) Patent No.: US 6,897,998 B2
(45) Date of Patent: May 24, 2005

(54) NON-LINEAR OPTICAL CARRIER FREQUENCY CONVERTER

(75) Inventors: Phillip T. Nee, Simi Valley, CA (US); Jeffrey H. Hunt, Chatsworth, CA (US)

(73) Assignee: The Boeing Company, Chicago, IL (US)

(*) Notice: Subject to any disclaimer, the term of this patent is extended or adjusted under 35 U.S.C. 154(b) by 228 days.

(21) Appl. No.: 10/299,195

(22) Filed: Nov. 19, 2002

(65) Prior Publication Data

US 2004/0095633 A1 May 20, 2004

(51) Int. Cl.$^7$ .............. G02F 1/355; G02F 2/02
(52) U.S. Cl. .................................. 359/326
(58) Field of Search ................. 359/326–332

(56) References Cited

U.S. PATENT DOCUMENTS

| | | | |
|---|---|---|---|
| 5,543,960 A | 8/1996 | Carrig et al. | 359/326 |
| 5,952,818 A | 9/1999 | Zhang et al. | 324/96 |
| 6,144,679 A | 11/2000 | Herman et al. | 372/21 |
| 6,236,779 B1 * | 5/2001 | Kafka et al. | 385/31 |
| 6,414,473 B1 | 7/2002 | Zhang et al. | 324/96 |
| 6,417,954 B1 | 7/2002 | Reynolds et al. | 359/330 |
| 6,441,949 B1 | 8/2002 | Reynolds et al. | 359/330 |

OTHER PUBLICATIONS

*Terahertz beam generation by femtosecond optical pulses in electro–optic materials*—Applied Physical Letters, vol. 61 (15), Oct. 12, 1992, pp. 1784–1786, Xu et al.
*Coherent measurement of THz optical rectification from electro–optic crystals*—Applied Physical Letters, vol. 61 (23), Dec. 7, 1992, pp. 2764–2766, Zhang et al.

* cited by examiner

*Primary Examiner*—John D. Lee
(74) *Attorney, Agent, or Firm*—Shimokaji & Associates, P.C.

(57) ABSTRACT

A carrier frequency converter for converting a first information carrier frequency of a first carrier to a second information carrier frequency of a second carrier. The converter includes an input control optics assembly for receiving a first carrier and adjusting the first carrier in accordance with first desired frequency, polarization and beam propagation parameters. A non-linear optical medium provides optical rectification of an output of the input control optics assembly. An output control optics assembly receives an output of the non-linear optical medium and adjusts the output in accordance with second desired frequency, polarization and beam propagation parameters. The output of the output control optics is a second carrier having an information bandwidth equivalent to the information bandwidth of the first carrier.

20 Claims, 2 Drawing Sheets

Input Signal Spectrum

Output Signal Spectrum

NON-LINEAR OPTICAL CARRIER FREQUENCY CONVERTER

BACKGROUND OF THE INVENTION

1. Field of the Invention

The present invention relates to carrier frequency conversion and more particularly to the use of non-linear materials to change a carrier frequency while maintaining the overall rate of information transfer constant.

2. Description of the Related Art

In communications, there is a need to readily and rapidly change the carrier frequency as the information traverses different transmission media. In the specific realm of communications in which information is carried through the modulation of electromagnetic radiation, there is often a need to change from one carrier frequency to another. The reason for this change may be associated with different hardware processing or transportation platforms. It may be due to a transition between the optical frequency carriers associated with fiber optical communications and lower frequency (microwave) carriers used for free space information transmission. Since these communications systems' technical evolution occurred independently, techniques for information transfer between systems have been developed on an ad hoc basis. Typically, this means that the electromagnetic radiation is detected and changed into an electronic format, which is then sent to a different electromagnetic radiation source at the new carrier frequency and transmitted at that new frequency. Specifically, to change carrier frequency from optical to radio frequency (rf), an optical photodetector with rf bandwidth is used to demodulate carrier down to baseband and signal is re-transmitted as rf. In order to convert from rf to optical, the rf carrier is demodulated to baseband by rf mixer and the optical carrier generated by re-transmitting the signal using a diode laser. Clearly, this additional step of changing the radiation to an electronic format and rebroadcasting at a new frequency causes considerable information bottlenecking.

A preferred method would be to convert between the carrier frequencies by direct electromagnetic mixing. In the case of rf carrier frequencies, carrier frequencies are up- and down-converted using rf frequency mixers. Nonlinear optical processes such as sum-frequency mixing or difference frequency mixing work well when both carriers are in the optical frequency regime.

Furthermore, in the case where the radiation is being used to transport digital information, the information transfer rate is fundamentally limited by the carrier frequency. For example, a carrier in the optical frequency range can transport approximately $10^3$ times more information per second than a carrier at microwave frequencies, due to the former's higher carrier frequency. The so-called information bandwidth is given by, $I_B = I_C \times N$, where $I_C$ is the frequency of the carrier and N is the number of carriers operating in that frequency regime. Unless N changes, $I_B$ drops precipitously when the carrier frequency drops. This loss of carrier rate can be addressed by using a proportionally larger number of carriers (N) at the lower frequency. However, this entails additional processing of the information while it is in the electronic mode between the two carriers as previously described, causing the bottleneck to worsen. It is desirable to be able to change carrier frequency to accommodate a change in the data transfer capability of the transmission medium and is further desirable to accomplish this without changing the electromagnetic radiation to an electronic signal first.

Non-linear optical (NLO) materials are unusual in that they allow electromagnetic radiations or light to directly interact with other light, with the material acting only as the mediating medium. One such example is disclosed in U.S. Pat. No. 6,441,949, issued to T. A. Reynolds et. al., which discusses the use of polyborates, materials formed from divalent metal ions and borate anions. Art in that patent discusses optical parametric applications, but does not mention applications to radiation production at microwave or terahertz frequency production.

Several patents exist which discuss means to generate terahertz electromagnetic radiation. U.S. Pat. No. 6,144,679 discusses a means to generate a coherent terahertz source and U.S. Pat. No. 5,543,960 discusses a particular mosaic of electro-optical crystals to perform this task. Neither recognizes discusses the production of a broadband terahertz wave.

Furthermore, related art also exists in the public literature. Papers by Xu et. al. Applied Physics Letters 61 (15), p 1784, 1992 and Zhang et. al. Applied Physics Letters 61 (15) p. 2764, 1992 discuss the physics associated with optical rectification. There are no applications discussed in either of these papers and no mention of use within the sphere of optical communications.

SUMMARY

In a broad aspect, the present invention is a carrier frequency converter for converting a first information carrier frequency of a first carrier to a second information carrier frequency of a second carrier. The converter includes an input control optics assembly for receiving a first carrier and adjusting the first carrier in accordance with first desired frequency, polarization and beam propagation parameters. A non-linear optical medium provides optical rectification of an output of the input control optics assembly. An output control optics assembly receives an output of the non-linear optical medium and adjusts the output in accordance with second desired frequency, polarization and beam propagation parameters. The output of the output control optics is a second carrier having an information bandwidth equivalent to the information bandwidth of the first carrier.

The present invention allows one to perform a one-step conversion of the data rate or modulation frequency as a result of a change in the data transmission capability of the transmission medium.

This scheme allows for the one-step conversion of the entire information bandwidth from the higher carrier frequency to the lower carrier frequencies without the associated electronic bottleneck. As such, it negates the need to create fractional sections or slices of the information bandwidth required for conversion to an electronic signal and then re-transmitted on lower-frequency carrier frequencies.

Other objects, advantages, and novel features will become apparent from the following detailed description of the invention when considered in conjunction with the accompanying drawings.

BRIEF DESCRIPTION OF THE DRAWINGS

The same parts or elements throughout the drawings are designated by the same reference characters.

DETAILED DESCRIPTION OF THE INVENTION

Figure 1:
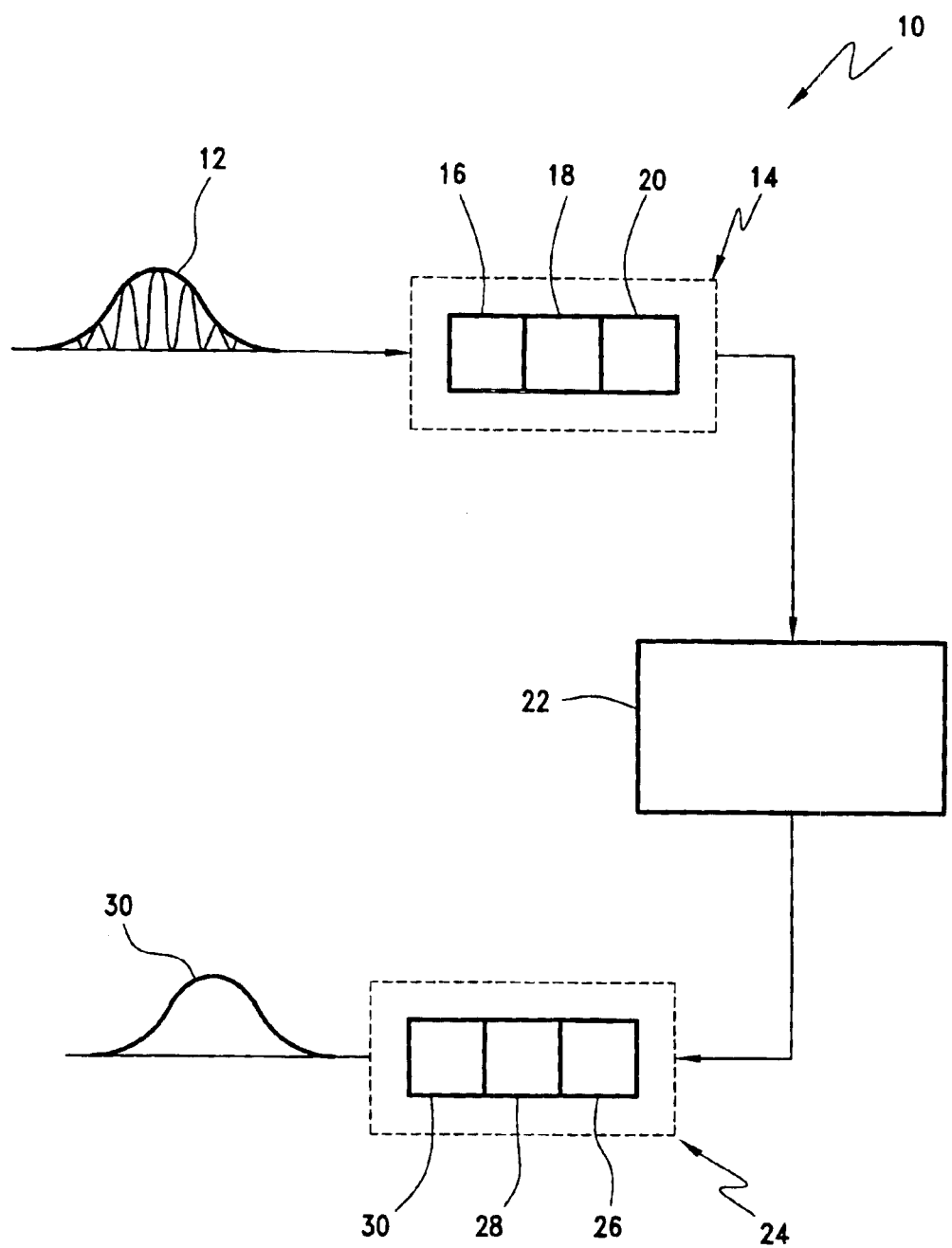
FIG. 1 is a schematic illustration of a preferred embodiment of present invention.

Referring now to the drawings and the characters of reference marked thereon, FIG. 1 illustrates a preferred embodiment of the present invention, designated generally as 10. An incoming first carrier 12 is received by an input control optics assembly, designated generally as 14. The input control optics assembly 14 adjusts the first carrier 12 in accordance with desired frequency, polarization and beam propagation parameters. These parameters could include, for example, precise wavelength filtering to the expected signal, the optical bandwidth of the incoming signal, or the polarization of the electromagnetic radiation or light. The frequency may be controlled to fit within the useful transparency range of the non-linear optical medium. It may be more precisely filtered to fit a known input signal, either from an image or from a digitally encoded communication beam.

The input control optics assembly 14 includes an input frequency control element 16 for receiving the first carrier 12. Element 16 may be, for example, a narrow frequency band filter, such as a holographic notch filter or broad band filter such as a color filter. Alternatively, it could a Fabry-Perot etalon or diffraction grating based frequency selection system. An input polarization control element 18 receives an output of the input frequency control element 16. The input polarization control element 18 polarizes the first carrier and may be, for example, a polarization plate, a Brewster's angle polarizer or a thin film polarizer. The precise polarizer to be selected depends on the particular application's engineering requirements such as polarization rejection ratio, size and weight of the polarizer, and the frequency range over which the converter must operate, etc.

An input propagation control element 20 receives an output of the input polarization control element 18 and provides an output to a non-linear optical medium 22. The output propagation control element 20 may comprise, for example, a single lens, double lens, refractive elements, or reflective elements.

The non-linear optical medium 22 provides optical rectification. It preferably comprises a nonlinear optical medium which is transparent at both optical and terahertz frequencies. Also, the medium must have an internal non-zero nonlinear susceptibility sufficient to mediate the optical rectification process.

Within nonlinear optics, a general optical process exists known as difference frequency generation. In this process, an input frequency at $\omega_1$ is changed into two output frequencies, $\omega_2$ and $\omega_3$, subject to, the energy constraint that $\omega_1=\omega_2+\omega_3$. In one special case $\omega_1=\omega_2$, with the implication that $\omega_3=0$. This zero-frequency component corresponds to the case of optical rectification. In practical terms, it implies that a pulsed optical carrier input which undergoes optical rectification will have an output whose carrier frequency is equal to the envelope of the input optical pulse. As an example, an optical pulse of 3 picoseconds duration will have a physical envelope of 3 millimeters. The optically rectified output will have a wavelength of that 3-millimeter envelope, with a corresponding frequency in the terahertz regime. More significantly, the use of a single pulse, implies that the terahertz signal will be composed of one-half wave signal. An analysis of the frequency bandwidth will show that there are many terahertz frequency components comprising this one-half wave. Consequently, the combination of the pulse format with optical rectification will generate a large number of frequency lines, such that the information bandwidth as described above will remain equal to that of the high frequency carrier The nonlinear optical medium may comprise, for example, lithium-niobate, potassium dihydrogen phosphate, silver thiogallite potassium titanium oxide phosphate or polyborates, gallium arsenide, lithium tantalite, zinc selenide, and dimethyl amino 4-N-methylstibazolium tosylate.

An output control optics assembly, designated generally as 24, receives the output of the non-linear optical medium and adjusts the non-linear optical medium output in accordance with second desired frequency, polarization and beam propagation parameters. The output control optics assembly 24 preferably includes an output frequency control element 26, an output polarization control element 28, and an output propagation control element 30, as discussed above with respect to the input control optics assembly 14.

The output 30 of the output control optics is a second carrier having an information bandwidth equivalent to the information bandwidth of the first carrier.

Figure 2:
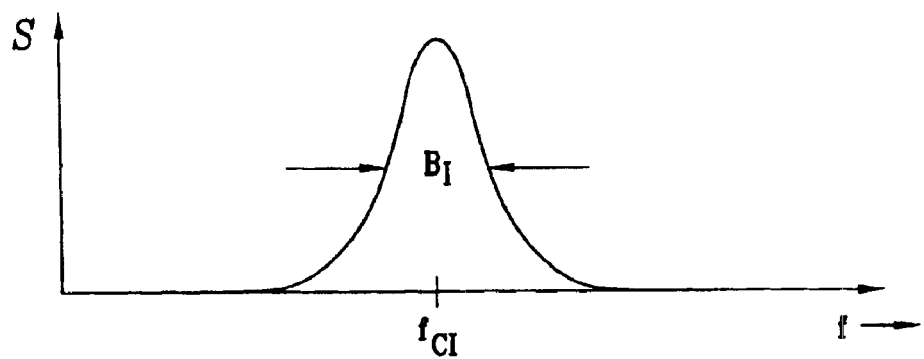
FIG. 2 is a graph of signal strength (S) vs. input center frequency ($f_{CI}$) illustrating the input signal spectrum.

Referring now to FIG. 2, a graph of signal strength (S) vs. input center frequency ($f_{CI}$) illustrates the input signal spectrum for the input carrier signal. It has a center frequency $f_C$, which is at an optical frequency and a bandwidth $B_I$. This is typical for a coherent optical or laser source, whose operation is at one frequency with a finite bandwidth.

Figure 3:
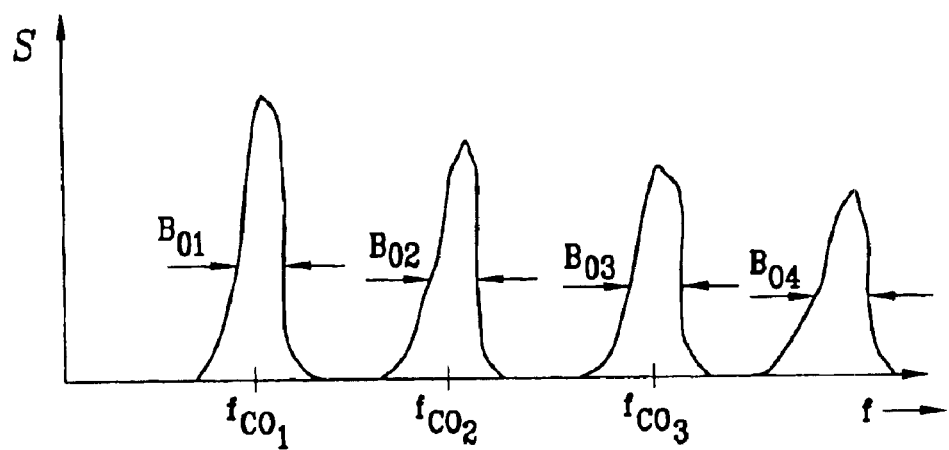
FIG. 3 is a graph of signal strength (S) vs. output center frequency ($f_{CO}$) illustrating the output signal spectrum.

Referring now to FIG. 3, is a graph of signal strength (S) vs. output center frequency ($f_{CI}$) that illustrates the output signal spectrum for the output carrier signal. As discussed above, the single half-wave will now have many frequency components as part of the carrier. The increased number of components will allow the information bandwidth, $I_B$ to remain the same as when the carrier is in the optical regime.

Propagation of electromagnetic radiation requires the use of different frequency regimes for different propagation environments. Optical communications, with their extremely high data rates, will be transmitted long distances in fibers or in short hops through free space. Long distance earth based or space based communications typically operate in the radio frequency (rf). The present system allows the direct conversion of signal carriers at optical frequencies to signal carriers at terahertz, rf or microwave frequencies. Electronic bottlenecking and loss of data transmission speed is minimized.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A carrier frequency converter for converting a first information carrier frequency of a first carrier to a second information carrier frequency of a second carrier, comprising:
   a) an input control optics assembly for receiving a first carrier and adjusting said first carrier in accordance with first desired frequency, polarization and beam propagation parameters;
   b) a non-linear optical medium for providing optical rectification of an output of said input control optics assembly;
   c) an output control optics assembly for receiving an output of said non-linear optical medium, and adjusting said non-linear optical medium output in accordance with second desired frequency, polarization and beam propagation parameters, wherein the output of said output control optics assembly is a second carrier having an information bandwidth equivalent to the information bandwidth of said first carrier; and, d) wherein said first information carrier frequency is in the optical frequency regime and said second information carrier frequency is in the radio or microwave regime.

2. The carrier frequency converter of claim 1, wherein said non-linear optical medium, comprises a non-linear optical material selected from the group consisting of lithium-niobate, potassium dihydrogen phosphate, silver thiogallite potassium titanium oxide phosphate or polyborates, gallium arsenide, lithium tantalite, zinc selenide, and dimethyl amino 4-N-methylstibazolium tosylate.

3. The carrier frequency converter of claim 1, wherein said non-linear optical medium, comprises a non-linear optical material that is transparent at both optical and terahertz frequencies.

4. The carrier frequency converter of claim 1, wherein said input control optics assembly comprises an input frequency control element for receiving said first carrier.

5. The carrier frequency converter of claim 1, wherein said input control optics assembly comprises an input polarization control element.

6. The carrier frequency converter of claim 1, wherein said input control optics assembly comprises an input propagation control element.

7. The carrier frequency converter of claim 1, wherein said input control optics assembly, comprises:

a) an input frequency control element for receiving said first carrier;

b) an input polarization control element for receiving an output of said input frequency control element; and, c) an input propagation control element for receiving an output of said input frequency control element and providing an output to said non-linear optical medium.

8. The carrier frequency converter of claim 1, wherein said output control optics assembly comprises an output frequency control element for receiving said first carrier.

9. The carrier frequency converter of claim 1, wherein said output control optics assembly comprises an output polarization control element.

10. The carrier frequency converter of claim 1, wherein said output control optics assembly comprises an output propagation control element.

11. The carrier frequency converter of claim 1, wherein said output control optics assembly, comprises:

a) an output frequency control element for receiving said first carrier;

b) an output polarization control element for receiving an output of said output frequency control element; and, c) an output propagation control element for receiving an output of said output polarization control element and providing an output from said output control optics assembly.

12. A method for converting a first information carrier frequency of a first carrier to a second information carrier frequency of a second carrier, comprising the steps of:

a) receiving and adjusting a first carrier in accordance with first desired frequency, polarization and beam propagation parameters, wherein said first carrier frequency is in the optical frequency regime;

b) optically rectifying the adjusted first carrier; and, c) receiving and adjusting the optically rectified first carrier in accordance with second desired frequency, polarization and beam propagation parameters to form a second carrier, wherein said second desired frequency is in the radio or microwave frequency regime and wherein said second carrier has an information bandwidth equivalent to the information bandwidth of said first carrier.

13. The method of claim 12, wherein said step of receiving and adjusting a first carrier comprises utilizing an input frequency control element for receiving said first carrier.

14. The method of claim 12, wherein said step of receiving and adjusting a first carrier comprises utilizing an input polarization control element for receiving said first carrier.

15. The method of claim 12, wherein said step of receiving and adjusting a first carrier comprises utilizing an input propagation control element for receiving said first carrier.

16. A communication system, comprising:

a) a receiver for receiving a first information carrier frequency of a first carrier, wherein said first information carrier frequency is the optical frequency regime;

b) a carrier frequency converter for converting said first carrier information frequency of said first carrier to a second information carrier frequency of a second carrier, wherein said second information carrier frequency is in the microwave or radio frequency regime and said carrier frequency converter, comprising:

i) an input control optics assembly for receiving said first carrier and adjusting said first carrier in accordance with first desired frequency, polarization and beam propagation parameters;

ii) a non-linear optical medium for providing optical rectification of an output of said input control optics assembly; and, iii) an output control optics assembly for receiving an output of said non-linear optical medium, and adjusting said non-linear optical medium output in accordance with second desired frequency, polarization and beam propagation parameters, wherein the output of said output control optics assembly has an information bandwidth equivalent to the information bandwidth of said first carrier; and, c) a transmitter for receiving said output of said output control optics and for transmitting said output.

17. The communication system of claim 16, wherein said receiver comprises an optical receiver.

18. The communication system of claim 16, wherein said transmitter comprises a terahertz transmitter.

19. The communication system of claim 16, wherein said transmitter comprises a microwave transmitter.

20. The communication system of claim 16, wherein said transmitter comprises a radio frequency (rf) transmitter.

* * * * *